Nov. 2, 1937.   E. L. HUSSMANN   2,098,147
GRINDER ATTACHMENT
Filed July 16, 1936
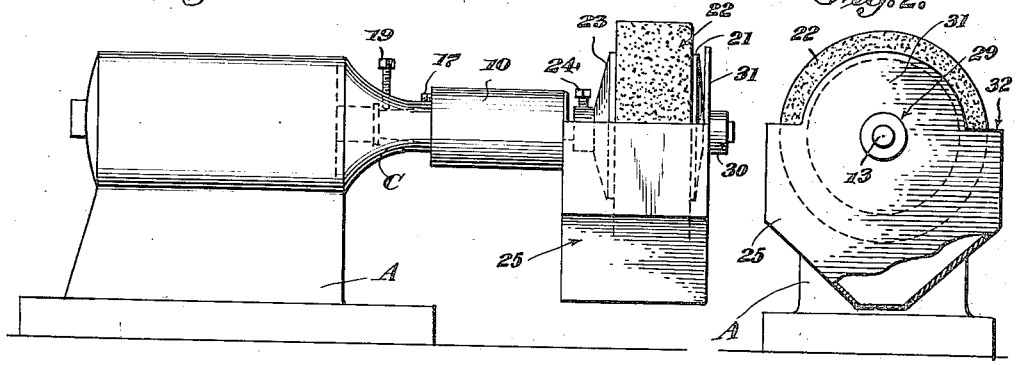
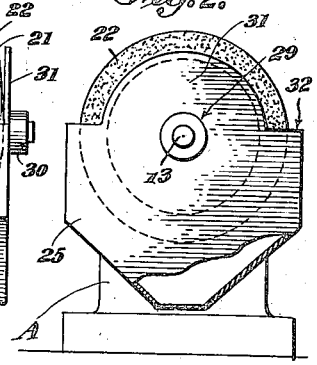
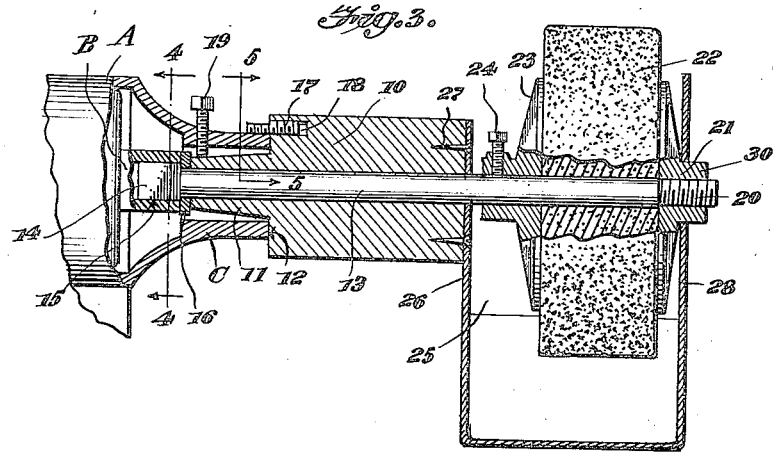
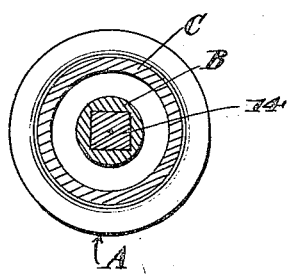
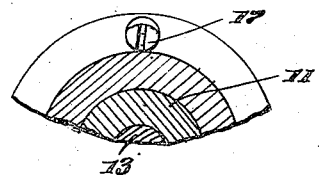
Inventor
ERNIE L. HUSSMANN
By *[signature]*
Attorney Patented Nov. 2, 1937

2,098,147

UNITED STATES PATENT OFFICE 2,098,147

GRINDER ATTACHMENT

Ernie L. Hussmann, Seiling, Okla.

Application July 16, 1936, Serial No. 91,016

1 Claim. (Cl. 51—241)

This invention relates to grinder attachments for motors and the like, and has for one of its objects the production of a knife grinder especially adaptable for attachment to the motor of a conventional meat or other similar grinder.

A further object of this invention is the production of a simple and efficient attachment for a meat grinder, wherein the sharpening wheel may be easily secured to the motor of a conventional meat grinder, and wherein the grinding or sharpening wheel will at all times be deeply immersed in water to keep the grinding wheel or stone cool.

Other objects and advantages of the present invention will appear throughout the following specification and claim.

In the drawing:

Figure 1 is a side elevation of my improved grinder attachment connected to a conventional driving motor of a conventional meat grinder;

Figure 2 is an end elevation of the improved grinder attachment, the water pan being partly shown in section;

Figure 3 is an enlarged longitudinal sectional view of the grinder attachment;

Figure 4 is a sectional view taken on line 4—4 of Figure 3;

Figure 5 is a sectional view taken on line 5—5 of Figure 3.

By referring to the drawing, it will be seen that A designates the conventional motor used in conjunction with the conventional type of meat grinder. The motor A is provided with the conventional driving shaft B, and the motor casing is provided with the receiving socket C.

My particular type of grinding wheel or sharpening device has been particularly designed for fitting the conventional motor of a conventional meat grinder whereby the necessity of reconstructing the conventional motor will be eliminated.

I employ a sleeve 10 having a tapering extension neck 11 which extension neck 11 is adapted to fit within the receiving socket C. This sleeve 10 is relatively large and is provided with an abutment shoulder 12 at one end. A grinding wheel supporting shaft 13 extends longitudinally through the sleeve 10 and is provided with a squared end 14 for fitting in the socket 15 of the motor shaft B. A steel washer 16 is carried by the shaft 13 and is adapted to abut against the end of the power shaft B of the motor A and is adapted to be interposed between the end of the shaft B and the end of the tapering neck 11 of the sleeve 10. A cam screw 17 is threaded into a threaded socket 18 formed in one end of the sleeve 10 and overhangs the outer end of the receiving socket C, as shown in Figure 3, to cause the cam screw to bind the sleeve 10 in clamped engagement with the end of the receiving socket C, thereby holding the sleeve 10 against vibration.

A binding screw 19 is extended through the receiving socket C and engages the tapering neck 11 to firmly bind the sleeve 10 in position, the shoulder 12 abutting against the outer end of the receiving socket C. In this manner the sleeve 10 will be firmly braced and held against vibration.

The outer end of the shaft 13 is threaded, as at 20, for receiving a collar 21 and a grinding or sharpening wheel 22 is mounted upon the shaft 13. A clamping collar 23 is also carried by the shaft 13 and is held in a set position by means of a set screw 24. The grinding wheel 22 will be firmly clamped between the collars 21 and 23.

A water containing pan or tray 25 partly encloses the grinding or sharpening wheel 22 and the inner wall 26 of the pan 25 is secured in any suitable or desired manner to the outer end of the sleeve 10 through the medium of the securing means such as is illustrated at 27. The outer wall 28 of the pan 25 is provided with a circular aperture 29 through which the circular neck 30 of the collar 21 extends constituting an efficient support for the wall 28 of the pan 25. The wall 28 is also provided with an upwardly extending portion 21 which terminates short of the outer edge of the wheel 22 and preferably conforms to the contour thereof. The upper edge 32 of the pan 25 extends in substantially the same transverse plane, or slightly above the longitudinal axis of the shaft 13. The pan 25 preferably tapers toward its lower end, as shown in Figure 2, and is adapted to be filled with water so that the grinding or sharpening wheel 22 will be immersed for substantially one-half of its area to prevent the grinding wheel from becoming too hot.

It should be understood that through the medium of the attachment illustrated, a very simple and efficient grinding attachment has been produced which may be secured to the standard or conventional motor of a meat grinder whereby the meat grinder itself may be removed from the motor and the sharpening or knife grinding attachment substituted in its place, providing in this way a means for sharpening tools such as knives, cleavers, and the like, without the necessity of reconstructing the conventional motor.

Having described the invention, what I claim as new is:—

In combination with a driving unit having a casing formed with an open ended socket and a rotor having a shaft formed with a socket aligned with the inner end of the socket of the casing, a grinder comprising a sleeve having a reduced neck at its inner end fitting into the socket of the casing and disposing the inner end of the sleeve close against the outer end of the socket, a cam screw threaded into the inner end of said sleeve in radial spaced relation to the bore thereof and projecting from the sleeve longitudinally thereof in overlapping and gripping engagement with the socket of the casing to hold the sleeve stationary, a set screw carried by the socket of the casing radially thereof and gripping said neck, a driven shaft journaled through the bore of said sleeve with one end projecting from said neck and engaged in the socket of the rotor shaft, said driven shaft having its other end portion projecting from the outer end of said sleeve, a grind stone carried by the outwardly projecting position of said driven shaft, a water pan about the lower portion of said stone having inner and outer side walls perforated to receive the driven shaft, the inner side wall being firmly secured against the outer end of said sleeve and maintaining the water pan in operative relation to the grind stone.

ERNIE L. HUSSMANN.